(No Model.)
P. C. SHIPLEY.
LEDGER PLATE.
No. 520,807. Patented June 5, 1894.
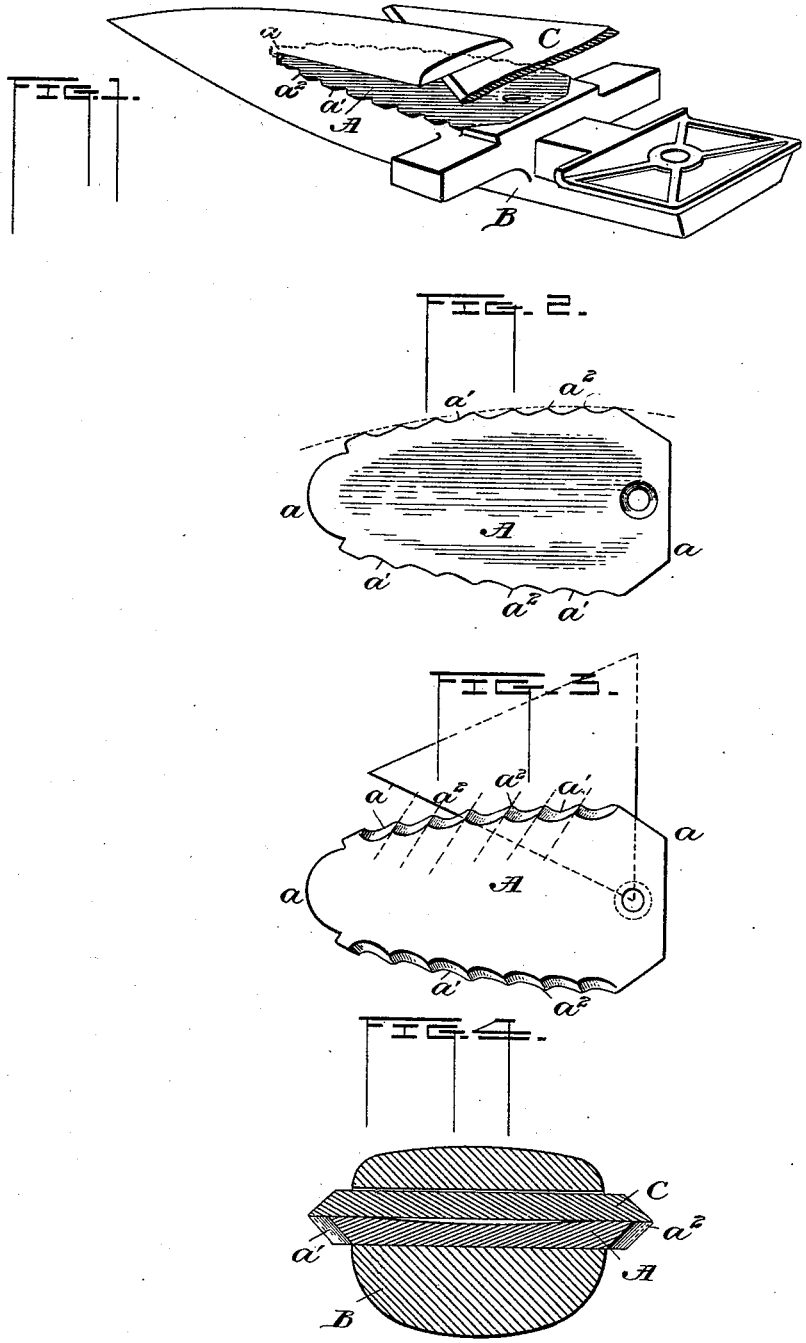

UNITED STATES PATENT OFFICE.

PETER C. SHIPLEY, OF RED OAK, IOWA, ASSIGNOR OF ONE-THIRD TO OREN E. JACKSON, OF SAME PLACE.

LEDGER-PLATE.

SPECIFICATION forming part of Letters Patent No. 520,807, dated June 5, 1894.

Application filed April 20, 1893. Serial No. 471,118. (No model.)

*To all whom it may concern:*

Be it known that I, PETER C. SHIPLEY, a citizen of the United States, residing at Red Oak, in the county of Montgomery and State of Iowa, have invented certain new and useful Improvements in Ledger-Plates; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the cutting apparatus of harvesting machines, and its object is to increase the efficiency and durability of the ledger plates.

The invention consists in a ledger plate having its edges formed on convex curves, and cut into scallops, whereby the stalks of grass or other vegetation are prevented from sliding to the end of the plate, and the danger of choking the knives, especially when they have become worn hollow, is avoided.

In the drawings, Figure 1 is a perspective view of a guard finger provided with my improved ledger plate. Fig. 2 is a top plan view of the plate. Fig. 3 is a bottom plan view, and Fig. 4 is a transverse section, on a large scale, of a guard finger, ledger plate and knife.

My ledger plate A has at each end the usual tenon $a$ to enter sockets in the guard finger B and hold it in place. The edges of the plate are not straight, but are formed on a slight convex curve from heel to point as indicated by the dotted line in Fig. 2. The object of this is to prevent the choking of the cutter knives, C, which is likely to happen with straight edged ledger plates, especially when the knives become worn hollow or concave along the edges. Besides being formed on a convex curve, each edge of the ledger plate is cut into concave scallops $a'$ whose meeting edges $a^2$ incline forward from the upper surface as clearly shown in Fig. 3. The scallops are beveled to form a sharp cutting edge around the entire curve from one edge $a^2$ to the next. When in action, these scallops hold the grass or other vegetation and present to the edge of the knife a series of small curved cutting blades each of which acts like a sickle to gather and hold the grass, and also subjects it to a drawing as well as a shearing cut. By scalloping the edges of the plate, I shorten the stroke of the knife. The first scallopful of grass is cut clean before the next is reached, so that the entire power of the machine is concentrated on one after another of a succession of small bunches. Actual trial proves that this gives the machine a much lighter draft than when a straight edged ledger plate is used. The points $a^2$ are inclined forward in order to get a bevel on the under side, and still retain the full strength of the plate in each point, and give each scallop a sharp, smooth edge. A serrated edge has fine teeth which break easily, but my scallop has the full strength of the plate in the points $a^2$. By inclining them forward the edge of the point lies at substantially right angles to the edge of the moving knife, and is thus in the best position to resist the strain. See dotted lines in Fig. 3. If the edge of the point stood at right angles with the edge of the plate, the strain would come upon said point sidewise, and tend to break off its point and dull it rapidly. The upper surface of the plate is dished or concaved to a depth of about one-sixteenth of an inch, as shown in Figs. 2 and 4, thereby reducing the friction and wear and causing the knife edge to slide close to the edge of the ledger plate.

Having thus described my invention, what I claim, and desire to secure by Letters Patent, is—

A ledger plate having its edges cut into concave scallops with beveled edges, the meeting edges of adjacent scallops being inclined forward from the upper side of the plate, substantially as described.

In testimony whereof I affix my signature in presence of two witnesses.

PETER C. SHIPLEY.

Witnesses:
R. M. ROBERTS,
C. G. DALLAS.